US006990203B2

(12) United States Patent
Glaab

(10) Patent No.: US 6,990,203 B2
(45) **Date of Patent: *Jan. 24, 2006**

(54) CABLE TELEVISION SETBACK DECODER AUTOMATIC CONTROL

(75) Inventor: Joseph B. Glaab, New Hope, PA (US)

(73) Assignee: General Instrument Corporation, Horsham, PA (US)

(*) Notice: Subject to any disclaimer, the term of this patent is extended or adjusted under 35 U.S.C. 154(b) by 57 days.

This patent is subject to a terminal disclaimer.

(21) Appl. No.: 10/262,399

(22) Filed: Oct. 1, 2002

(65) Prior Publication Data

US 2003/0035541 A1 Feb. 20, 2003

Related U.S. Application Data

(63) Continuation of application No. 09/192,631, filed on Nov. 16, 1998, now Pat. No. 6,459,793, which is a continuation of application No. 08/914,968, filed on Aug. 20, 1997, now Pat. No. 5,862,219, which is a continuation of application No. 08/440,201, filed on May 12, 1995, now abandoned.

(51) Int. Cl.
*H04N 7/167* (2006.01)

(52) U.S. Cl. ...................... 380/210; 380/212; 380/231; 725/31

(58) Field of Classification Search .................. 725/31; 380/210, 212, 231; 275/31
See application file for complete search history.

(56) References Cited

U.S. PATENT DOCUMENTS 4,222,068 A * 9/1980 Thompson .................. 380/222
4,408,225 A * 10/1983 Ensinger et al. ............ 380/225
4,621,285 A * 11/1986 Schilling et al. ............ 380/223
4,670,904 A * 6/1987 Rumreich ................... 380/226
4,672,440 A * 6/1987 Trahan ....................... 380/223
4,706,285 A * 11/1987 Rumreich ................... 380/221
4,993,066 A * 2/1991 Jenkins ....................... 380/227
5,231,665 A * 7/1993 Auld et al. ................. 380/241
5,237,420 A * 8/1993 Hayashi ...................... 348/570
5,862,219 A * 1/1999 Glaab ......................... 380/210
6,381,332 B1 * 4/2002 Glaab ......................... 380/210
6,459,793 B1 * 10/2002 Glaab ......................... 380/210

* cited by examiner

*Primary Examiner*—Gilberto Barrón, Jr.
*Assistant Examiner*—Jung Kim
(74) *Attorney, Agent, or Firm*—Benjamin D. Driscoll

(57) ABSTRACT

A receiver which receives a multichannel signal and which detects and outputs an unscrambled desired signal to a video display and speaker unit includes a first unit, a second unit and a controller. The first unit comprises a frequency agile tuner for receiving said multichannel signal and for outputting a selected CATV signal. The a second unit includes a unit means for receiving the selected CATV channel signal; a unit for detecting whether the selected CATV channel signal is scrambled; and a descrambler for descrambling a scrambled CATV channel signal and for outputting a descrambled CATV channel signal. The controller controls the output of the receiver such that a signal is output from the first unit to said video display and speaker unit when the selected CATV signal is unscrambled and a signal is output from the second unit to the video display and speaker unit only when a scrambled signal is detected. The content of the selected CATV channel signal controls the operation of the second unit.

30 Claims, 11 Drawing Sheets

CABLE TELEVISION SETBACK DECODER AUTOMATIC CONTROL

CROSS REFERENCE TO RELATED APPLICATIONS

This application is a continuation of U.S. patent application Ser. No. 09/192,631, filed Nov. 16, 1998, now U.S. Pat. No. 6,459.793, filed Oct. 1, 2002, which is a continuation of U.S. patent application Ser. No. 08/914,968, filed Aug. 20, 1997, now U.S. Pat. No. 5,862,219, issued Jan. 19, 1999, which is a continuation of U.S. patent application Ser. No. 08/440,201, filed May 12, 1995, now abandoned, which are incorporated by reference as if fully set forth.

FIELD OF INVENTION

This invention relates generally to cable television receivers. More specifically, it pertains to a setback decoder which automatically detects when a scrambled signal is input to a receiver and provides a descrambled output signal to the receiver without requiring any control messages between the decoder and the receiver.

A typical CATV subscriber installation includes a settop descrambler which is connected between the CATV service provider and the subscriber's television or video cassette recorder (VCR). The descrambler includes a tuner, for tuning the descrambler to a selected CATV channel, and a descrambling module, for providing descrambling of scrambled premium channels that the subscriber is authorized to view. A descrambled video signal is output from the descrambler to the television or VCR on a predetermined carrier frequency, typically corresponding to television channels 3 or 4.

Since the descrambler typically provides a single channel output to the television, many of the built-in functions of the television may become inoperative. For example, the "picture-in-picture" feature requires dual tuners for simultaneous receipt of video signals on two television channels. Since descramblers provide only a single output, the "picture-in-picture" feature becomes inoperative. Additionally, subscribers are often frustrated by the need for multiple remote controllers, one for controlling the descrambler, a second for controlling the television set, and possibly a third for the VCR.

To eliminate the need for a separate tuner within the descrambler, manufacturers have offered televisions with broadband tuners which are capable of accessing the entire CATV frequency spectrum. However, these televisions do not include descrambling capabilities.

Most recently, cable-ready receivers are being developed which receive a radio frequency (RF) CATV input signal and provide an intermediate frequency (IF) output to an associated descrambler. These receivers require the use of a complicated protocol and signaling arrangement between the receiver and the descrambler in order to effectively detect and descramble scrambled CATV input signals viewing by a subscriber. Although the control signaling between the receiver and the descrambler provides full functionality of the receiver while descrambling the desired CATV premium channel, this complex arrangement is costly and difficult to manufacture.

Accordingly, there exists a need for a simple receiver and descrambler arrangement which provides descrambling of scrambled CATV input signals.

SUMMARY

The present invention comprises a setback decoder which monitors the IF output from a cable-ready receiver, such as a television or VCR, and provides a descrambled audio and video (A/V) signal back to the receiver. When the received CATV signal is scrambled, the decoder automatically detects the scrambled signal, determines whether the subscriber is authorized to view the selected program, and descrambles the signal to provide descrambled A/V output to the receiver. The receiver detects the video output signal from the decoder and outputs the information to the subscriber. Since the decoder automatically detects the presence of a scrambled CATV signal and the receiver automatically detects the input of a descrambled output signal from the decoder, no control messages are exchanged between the receiver and the decoder.

Accordingly, it is an object of the present invention to provide a setback decoder for automatically detecting and descrambling scrambled CATV signals and providing a descrambled output.

Other objects and advantages of the system will become apparent to those skilled in the art after reading the detailed description of a presently preferred embodiment.

BRIEF DESCRIPTION OF THE DRAWING(S)

DETAILED DESCRIPTION OF THE PREFERRED EMBODIMENT(S)

Figure 1:
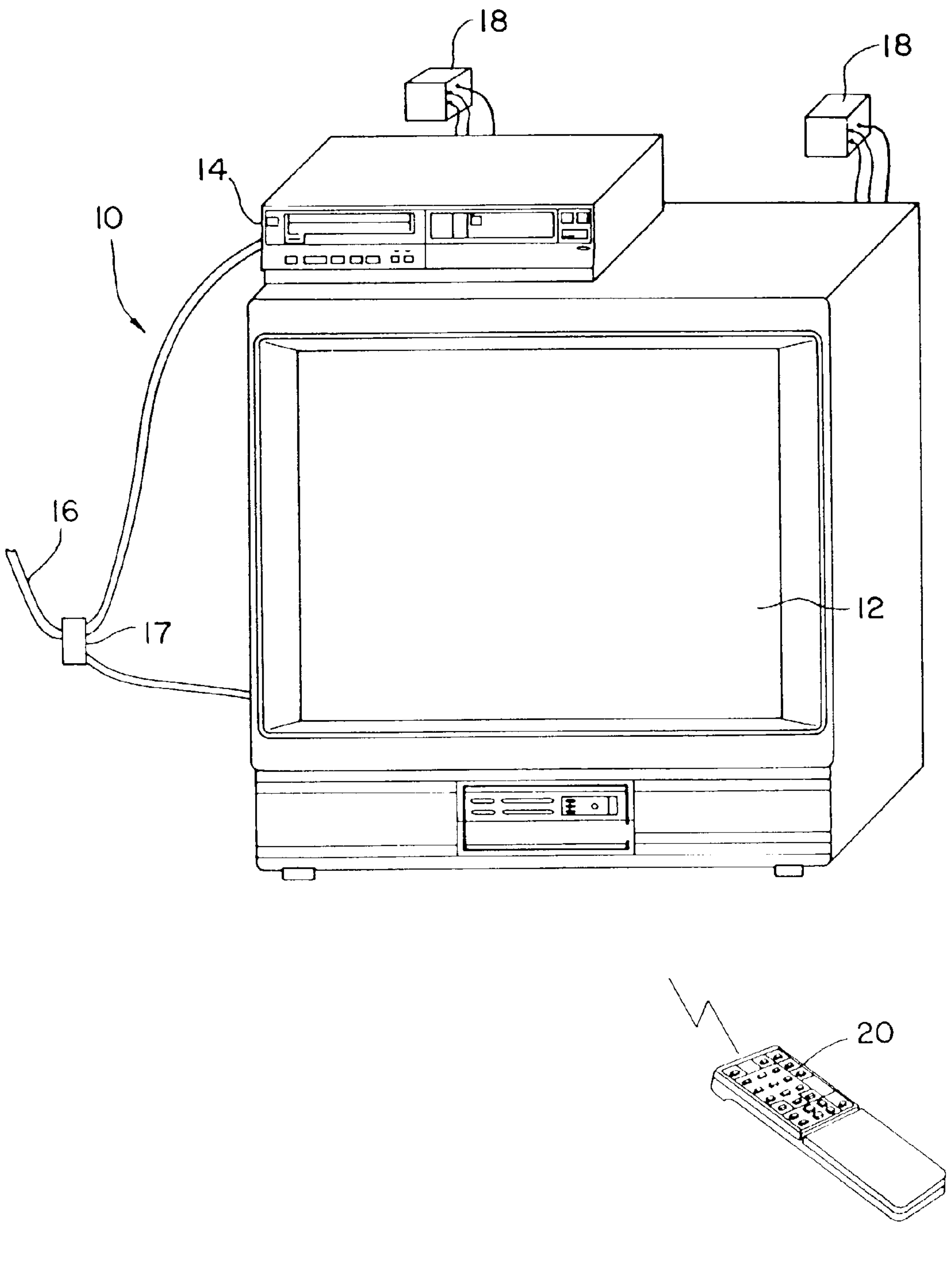
FIG. 1 is a CATV subscriber installation made in accordance with the teachings of the present invention.

The preferred embodiment of the present invention is shown in FIG. 1. The CATV subscriber installation 10 includes one or more cable-ready receivers, which are shown in FIG. 1 as a television 12 and a VCR 14. The receivers 12, 14 are connected to a CATV input 16 and a splitter 17 to receive programming signals from the CATV provider. The input line 16 is connected to a conventional fiber-coax CATV network. Alternatively, the input line 16 may be connected to a microwave antenna to receive "wireless cable" programming. A received CATV signal comprises a carrier signal and A/V information. Each receiver includes a frequency agile broadband tuner 36 (shown in FIG. 3), which is selectively tuned to specific CATV channels. The output from the tuner 36 is externally accessible on an intermediate frequency (IF) carrier.

Figure 2:
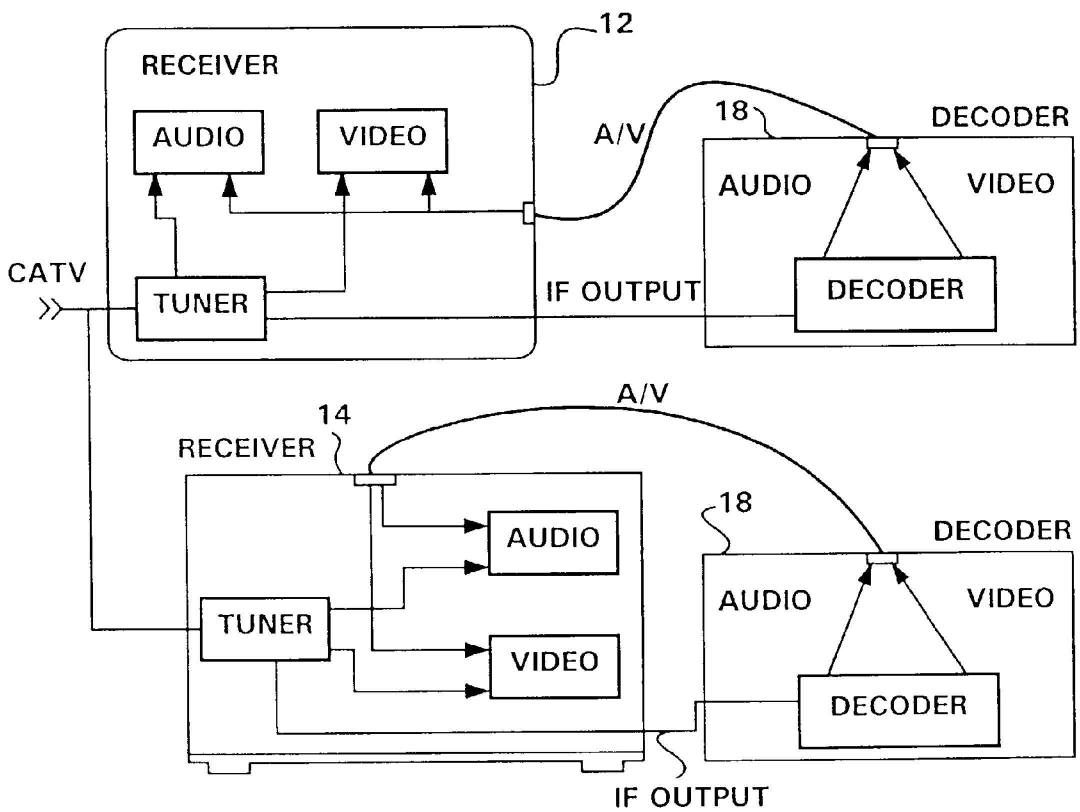
FIG. 2 is a block diagram of cable-ready receivers which are individually coupled to the decoder of the present invention.

As shown in FIG. 2, each receiver 12, 14 is individually connected to a decoder 18, which automatically detects when a scrambled CATV signal is received by the receiver 12, 14 and provides a descrambled A/V signal to the receiver 12, 14, as will be described in detail hereafter. The receivers 12, 14 are controlled by the subscriber via an IR remote control 20, for selection of a desired CATV channel.

Figure 3:
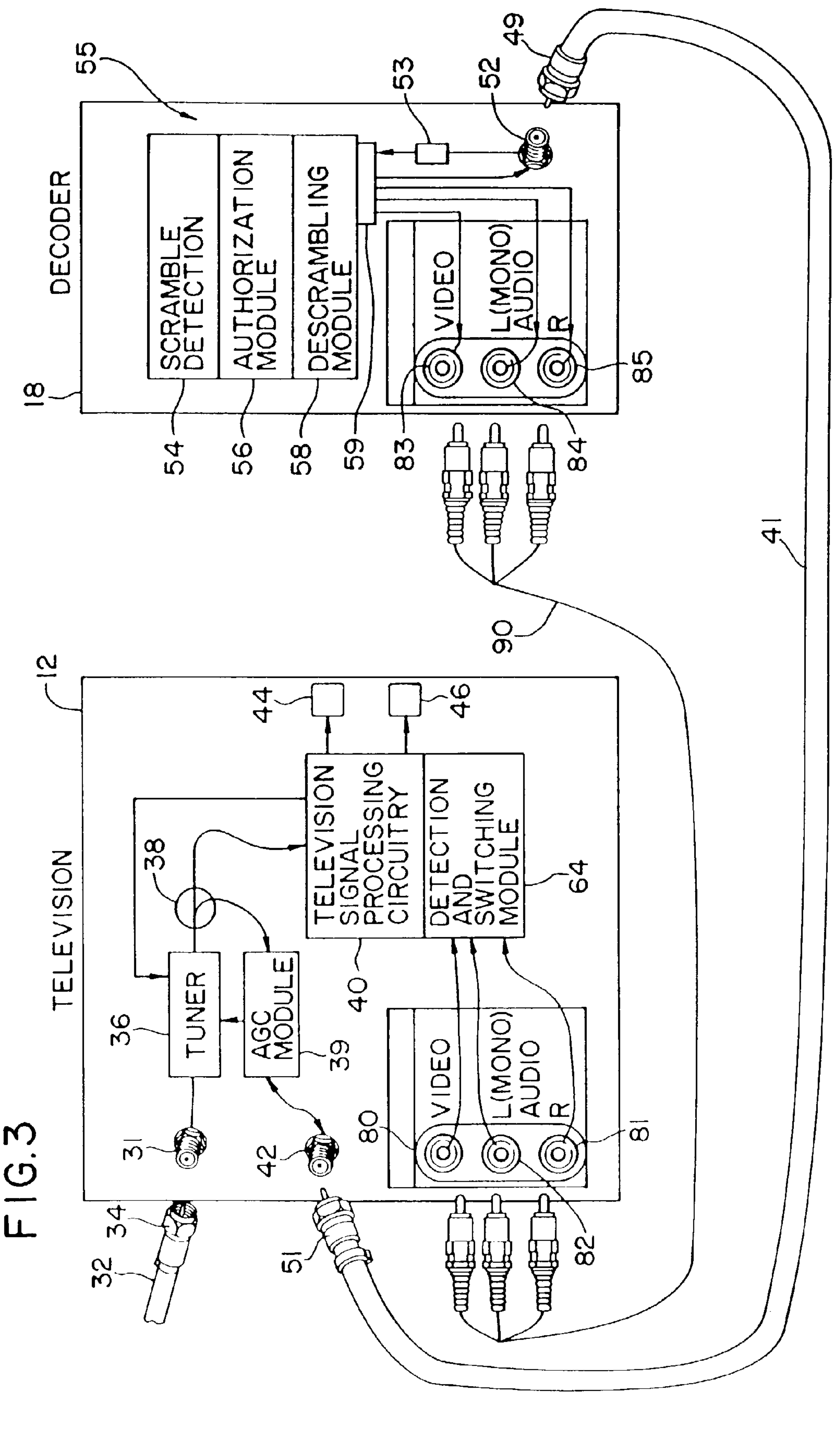
FIG. 3 is a block diagram of a cable-ready receiver and a decoder made in accordance with the teachings of the present invention.

The preferred embodiment of the present invention will be described with reference to FIG. 3. The CATV receiver is shown in FIG. 3 as a television 12. However, the receiver may comprise a VCR 14 or any other type of cable-ready device which accepts a broadband RF input signal and outputs the received A/V information on an IF carrier. The television 12 is coupled to the CATV network via a coaxial cable 32 terminated with an F-type connector 34 at a CATV input port 31. The CATV operator provides broadcast and interactive video and audio programming on a plurality of 6 MHz channels to the subscriber over the full bandwidth of the CATV network, which may be up to 1 Ghz.

Figure 7:
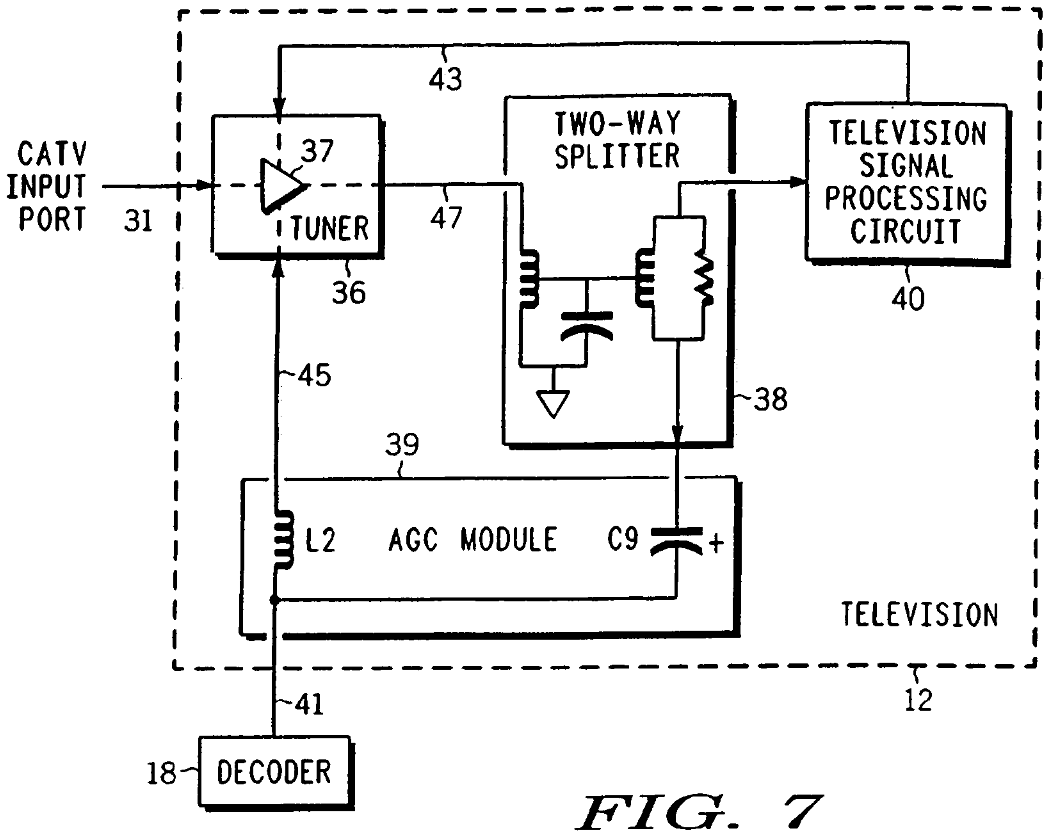
FIG. 7 illustrates how the gain of an amplifier within a tuner in the receiver of FIG. 3 is controlled by television signal processing circuitry when descrambling is not required, and is controlled by the decoder of FIG. 3 when descrambling is required.

FIG. 7 illustrates how the gain of an amplifier 37 in a tuner 36 within the television 12 of FIG. 3 is controlled by television signal processing circuitry 40 when descrambling is not required by providing a first gain control signal 43, and how the gain of the amplifier 37 is controlled by the decoder 18 via an automatic gain control (AGC) module 39 when descrambling is required by providing a second gain control signal 45. The tuner 36 is coupled to the CATV input port 31, and tunes to the specific carrier frequency of the channel selected by the subscriber. The tuner 36 processes a signal on the selected channel and amplifies the resulting A/V signal using the amplifier 37 residing therein. The gain of the amplifier 37 is controlled so that the output 47 of the tuner 36 remains essentially constant despite variations in strength of the CATV input signal received at the CATV input port 31. When a "normal" or unscrambled CATV signal is received by the tuner 36, the gain of the amplifier 37 is controlled by the television signal processing circuitry 40 using the first gain control signal 43. However, as will be explained in further detail hereinafter, when a scrambled CATV signal is received at the CATV input port 31, the gain of the amplifier 37 is controlled by the decoder 18 through the AGC module 39 using the second gain control signal 45.

The received A/V signal is output from the tuner 36 on an IF carrier to a signal splitter 38. If no descrambling is required, the A/V signal is processed by the signal processing circuitry 40. Audio and video information is separated and processed by the signal processing circuitry 40 to provide video output to a monitor 44 and audio output to speakers 46. A subscriber, therefore, will be able to view and listen to the selected program. A detailed discussion of the signal processing circuitry 40, which is well known to those skilled in the art, is outside the scope of this description.

When scrambled CATV input signals are received by the tuner 36, such as on premium cable television channels, interactive video channels, and pay-per-view channels, the signal processing circuitry 40 will be unable to descramble and process the A/V signal. Therefore, the audio and video programs will be unintelligible. To descramble the A/V signal, the A/V signal is forwarded on a selected IF carrier, preferably 45 MHz, through the signal splitter 38 to an IF/AGC port 42 for use by an external device.

The decoder 18 includes a tuner 53 which is selectively tuned to the IF carrier output from the television 12. The IF/AGC port 52 on decoder 18 and the IF/AGC port 42 on television 12 are connected via a coaxial cable 41, terminated at both ends by F-type connectors 49, 51.

Figure 4:
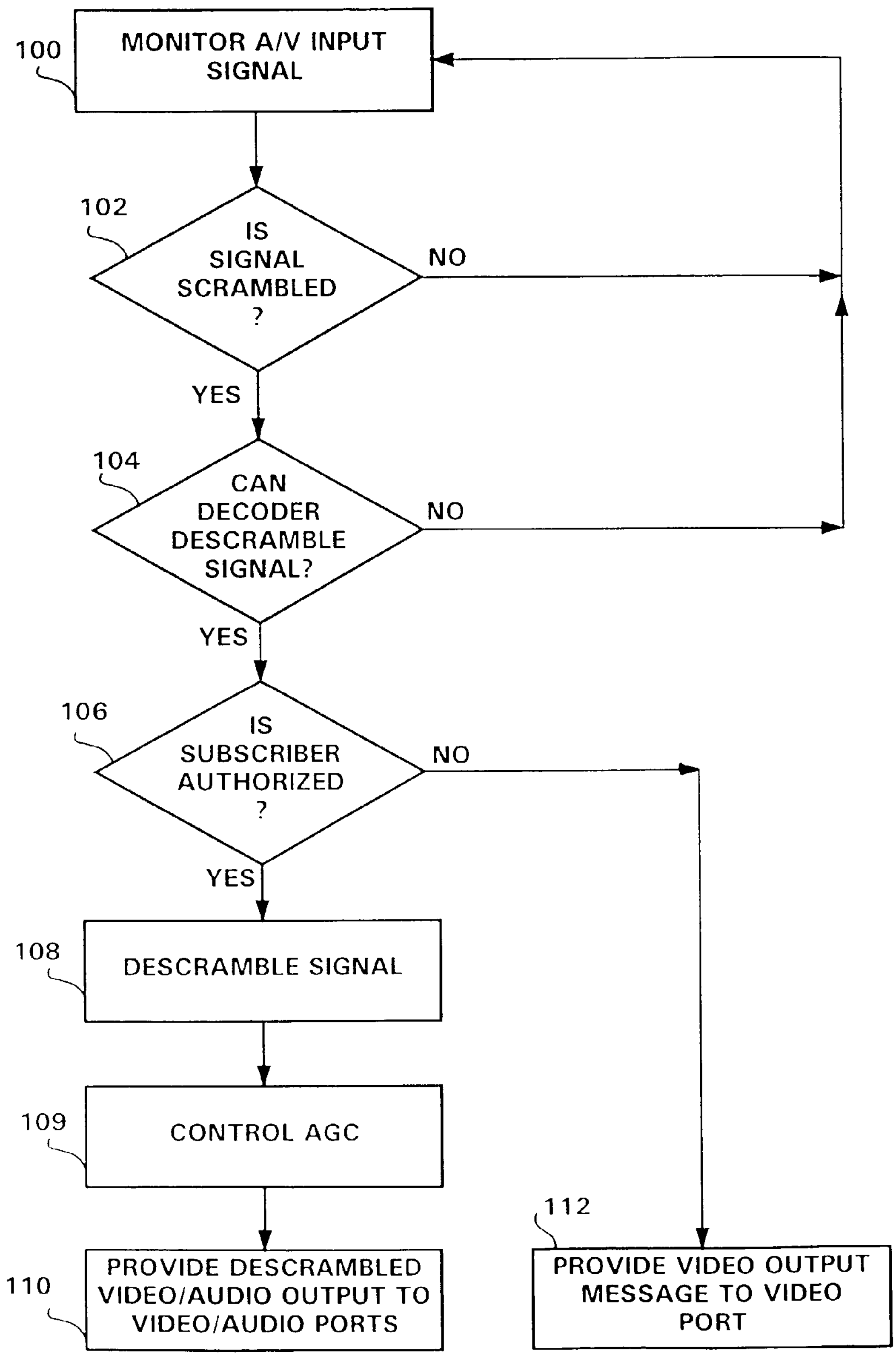
FIG. 4 is a flow diagram of the process used by the processor within the decoder.

A processor 55 within the decoder 18 receives and processes the A/V signal using several software-implemented modules, as shown in FIG. 4. The scramble detection module 54 continually monitors the received A/V signal (step 100). If the scramble detection module 54 detects that the signal is not scrambled (step 102), the processor 55 takes no further actions and no signals are output from the decoder 18. There are many types of audio and video scrambling, scrambling detection, and descrambling techniques that are well known by those skilled in the art. A detailed discussion of these techniques is outside the scope of this invention. If the scramble detection module 54 determines that the signal is scrambled (step 102), the module 54 determines whether the type of scrambling being utilized may be descrambled by the descrambling module 58 (step 104). If the scrambling technique is not supported (i.e. cannot be descrambled) by the descrambling module 58, the decoder 18 takes no further action.

If the technique used to scramble the A/V signal is a compatible scrambling technique, the authorization module 56 determines whether the subscriber is authorized to receive the scrambled video services that have been selected (step 106). As is well known to those skilled in the art, authorization information, such as a subscriber address identifier, is detected on the specific channel being monitored by the decoder 18. This information is compared to an authorization code stored within the memory of the processor 55 to determine if the subscriber is an authorized user.

Figure 11:
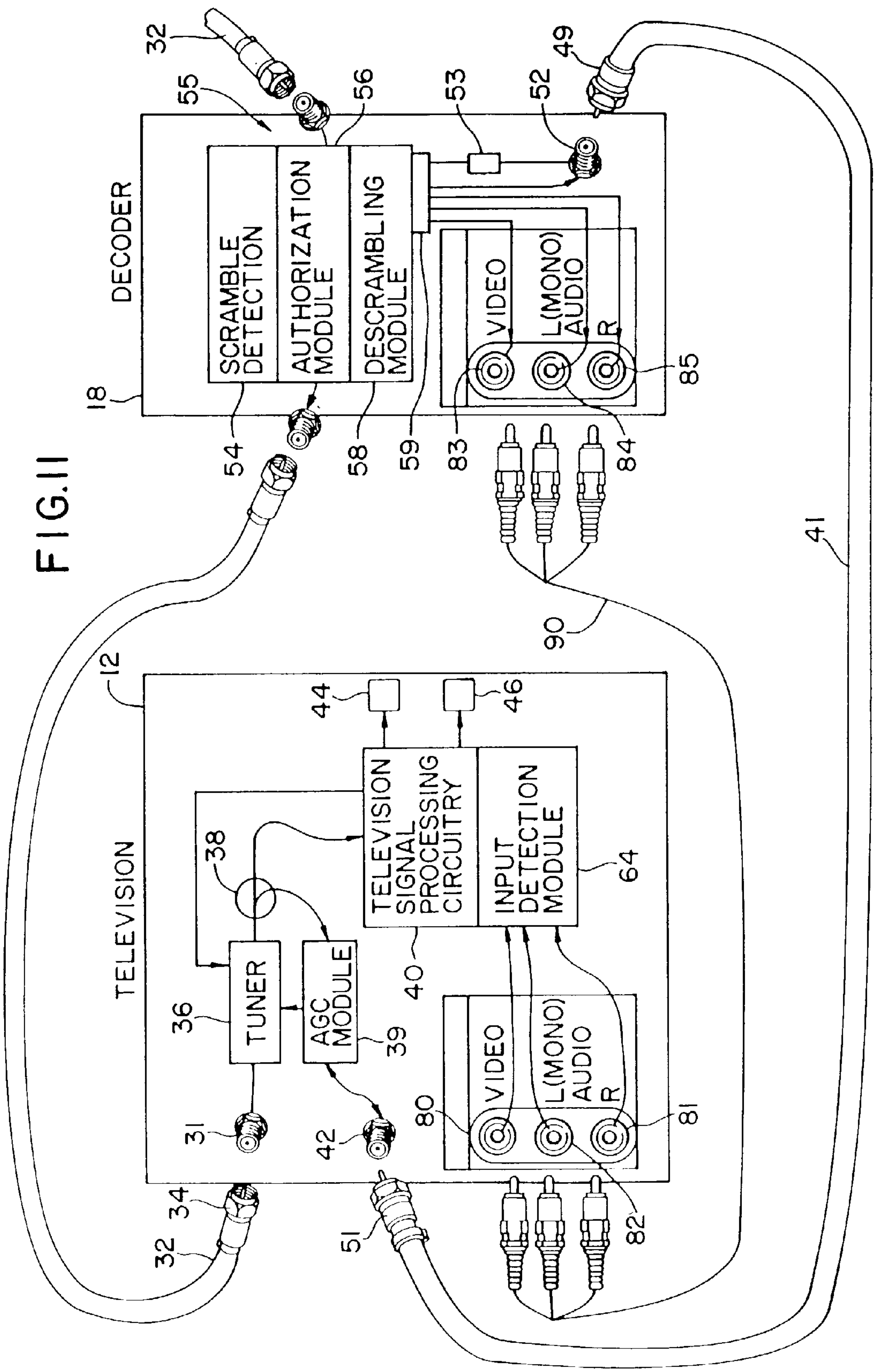
FIG. 11 is a block diagram of a first alternative embodiment of the decoder of FIG. 3.

Alternatively, the CATV scrambling system may use extra RF carriers (out-of-band) to send address, control and authorization data to the access control device. As shown in FIG. 11, the CATV input may "loop through" the decoder 18 prior to entering the television 12. This permits access by the decoder 18 to the extra RF carriers.

If the subscriber is not authorized, the decoder 18 provides a video output signal to the video port 83 (step 112) to inform the subscriber that they have not been authorized to receive the selected service. This message may also include instructions to enable the subscriber to order and pay for the service to become an authorized user. These types of messages are commonly used for pay-per-view video services.

Once the authorization module 56 determines that the subscriber is authorized to receive the service, the A/V signal is descrambled (step 108) by the descrambler module 58. An output module 59 within the decoder 18 provides a low impedance DC signal to the AGC module 39 through the IF/AGC port 52. As shown in FIG. 7, the low impedance signal from the decoder 18 is input to the tuner 36 and overrides the higher impedance AGC signal from the signal processing circuitry 40. This permits the decoder 18 to automatically control the gain of the tuner's amplifier when a scrambled signal is detected by the decoder 18. No control messages between the television 12 and the decoder 18 are required.

The descrambled baseband A/V signals are output from the input/output (I/O) module 59 to the input detection and switching module 64 via the A/V output ports 83, 84, 85 the shielded cable 90 and the A/V input ports 80, 81, 82. When the detection and switching module 64 detects a signal at the input ports 80, 81, 82, it switches the source of the A/V input provided to the signal processing circuitry 40 from the tuner 36 to the decoder 18. Accordingly, the signal processing circuitry 40 will display descrambled A/V output to the monitor 44 and the speakers 46.

Figure 9:
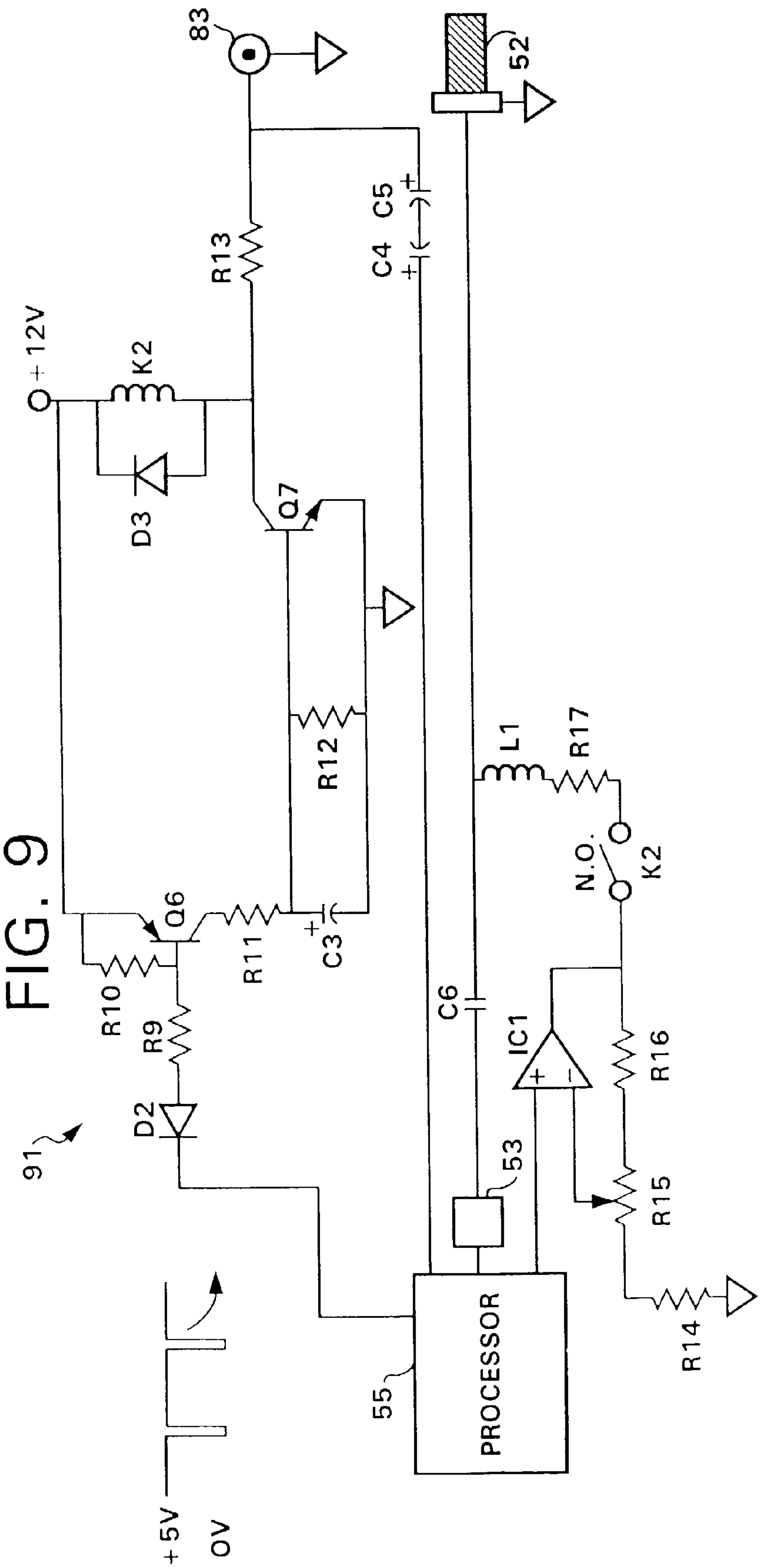
FIG. 9 is a schematic diagram of the video output section used in the decoder of FIG. 3.
Figure 10:
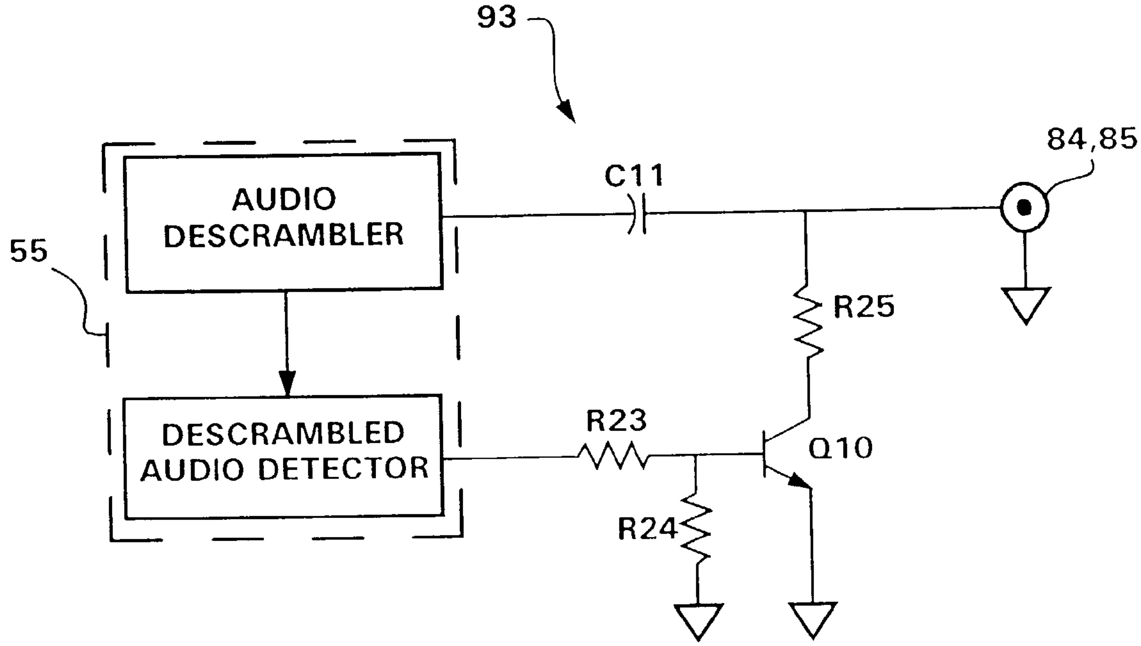
FIG. 10 is the audio output section used in the decoder of FIG. 3.

A more detailed explanation of the I/O module 59 will be presented with reference to FIGS. 9 and 10. The audio and video signals are separately descrambled and output.

The video output section 91 is shown in FIG. 9. The IF carrier with the A/V information is received through port 52. When the scramble detector module 54 detects a scrambled signal, a pulse train is output from the authorization module 56 which provides the descrambling synchronization. Diode D2 turns on transistor Q6 through current limiting resistor R9 when the drive pulses are at 0 VDC. Resistor R10 allows transistor Q6 to turn off when current is no longer applied to the base of transistor Q6. When transistor Q6 is turned-on, current flows across the emitter-collector junction of transistor Q6 through current limiting resistor R11 charging capacitor C3. Capacitor C3 stores energy and ensures that transistor Q7 turns on while the pulses are present.

Transistor Q7 acts as a current sink thereby turning on relay K2. Resistor R12 dissipates the energy across capacitor C3 when the drive pulse is no longer present. Relay K2 closes a pair of normally open contacts which complete the circuit to output a low impedance AGC output signal from the decoder 18 to the external AGC/IF output 52. The descrambled video signals from the processor 55 flow through capacitors C4 and C5 to the output connector 83. When the decoder 18 detects a scrambled signal, and relay K2 is energized, the AGC signal is output from the decoder 18 through operational amplifier IC1 and through current limiting resistor R17 and inductor L1. Resistors R14, R15 and R16 provide the feedback around the operational amplifier and variable gain.

In the same manner, as shown in FIG. 10, descrambled audio signals are descrambled and output from the audio output section 93.

Figure 5:
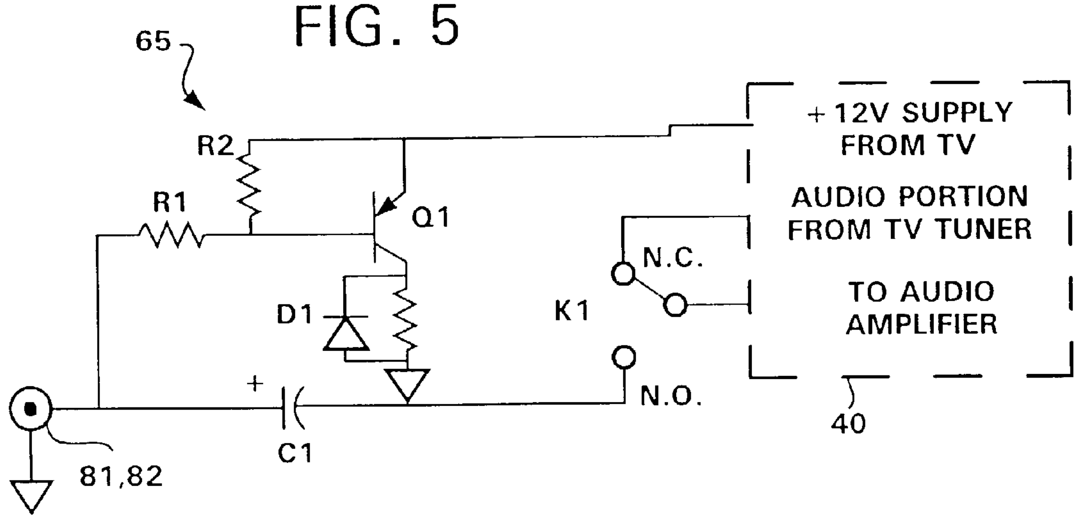
FIG. 5 is a schematic diagram of the audio switching module in the receiver of FIG. 3.

The detection and switching module 64 included within the television 12 will be explained in greater detail with reference to in FIGS. 5, 6 and 8. As shown in FIG. 5, a descrambled audio signal from the decoder 18 is presented to the audio input ports (left and right) 81, 82. In the preferred embodiment, an audio switch 65 is provided for each audio channel (left and right). The audio switching module 65 provides switching from "normal" unscrambled audio signals from the tuner 36 to descrambled audio signals from the decoder 18 using relay K1 and transistor Q1. The audio signals from the decoder 18 have a DC component which is blocked by capacitor C1. Capacitor C1 allows the audio portion of the signal to be amplified. The DC component of the signal flows through current limiting resistor R1 to the base of transistor Q1. A resistor R2 is connected from an available 12 VDC supply from the signal processing circuitry 40 to the base of transistor Q1. This resistor R2 allows transistor Q1 to turn off when current is no longer applied to the base of transistor Q1. The emitter of transistor Q1 is also connected to the 12VDC supply. The DC component from the decoder 18 turns transistor Q1 on. Current flows from the 12 VDC supply through the emitter-collector junction of transistor Q1 to relay coil K1.

Associated with relay K1 is a set of form C contacts. When relay coil K1 is energized, the contacts switch from the normal audio signals received from the tuner 36 to the descrambled audio signals provided by setback decoder 18.

Suppression diode D1 protects transistor Q1 from the reverse inductive surge from relay coil K1 upon de-energization.

Figure 6:
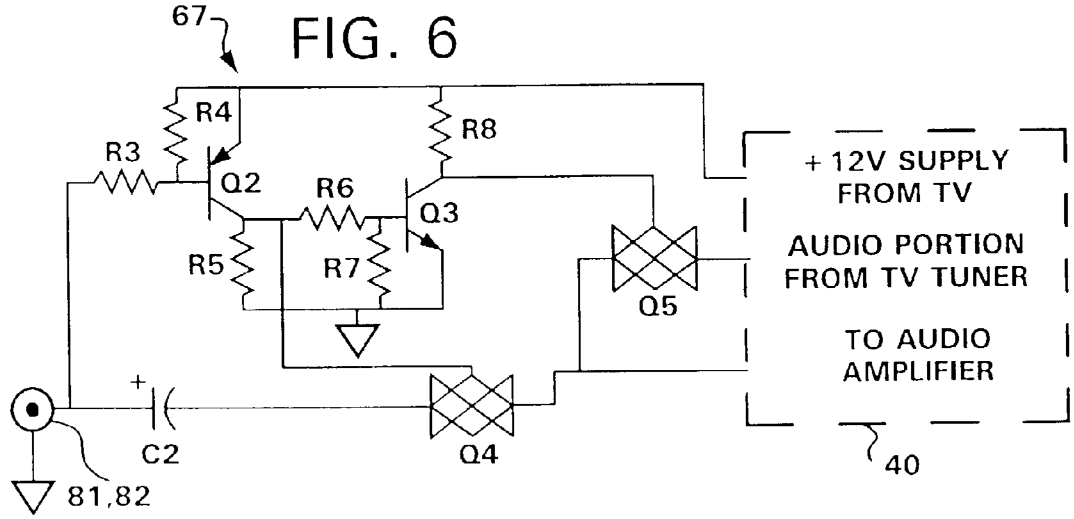
FIG. 6 is a schematic diagram of an alternative embodiment of the audio switching module of FIG. 5.

An alternative embodiment of the audio switching module 65, using CMOS semiconductor switches, is shown in FIG. 6. Each semiconductor switch Q4, Q5 has an input, an output and a control gate. When voltage is applied to the control gate, the switch conducts. Capacitor C2 blocks the DC portion of the decoder 18 audio signal from entering the audio amplifier within the signal processing circuitry 40. CMOS switch Q5 is controlled by transistor Q3 and CMOS switch Q4 is controlled by transistor Q2. When no input is detected from the decoder 18, CMOS switch Q5 is held in a state of conduction by current flowing through current limiting resistor R8. When a descrambled audio signal is detected, the DC component on the audio signal flows through current limiting resistor R3, turning-on transistor Q2. Resistor R4 allows transistor Q2 to turn off when current is no longer applied to the base of transistor Q2. When transistor Q2 is turned on, current flows across the emitter-collector junction and through current limiting resistor R6, turning-on transistor Q3. When transistor Q3 is turned-on, current flows through resistor R8 through the collector-emitter junction to signal common, thereby acting as a current sink.

When transistor Q3 is turned on, the collector of transistor Q2 is less positive than when transistor Q2 is turned-off, thereby turning off CMOS switch Q5. In conjunction with turning transistor Q3 on, current also flows through transistor Q2 thereby turning CMOS switch Q4 on. Transistors Q2 and Q3 provide a complimentary switching action for CMOS switches Q4 and Q5.

Resistor R7 provides a ground path from the base of transistor Q3 to signal common allowing transistor Q3 to turn-off when current is no longer applied to the base of transistor Q3 by transistor Q3 when the descrambled audio signal is no longer present.

Figure 8:
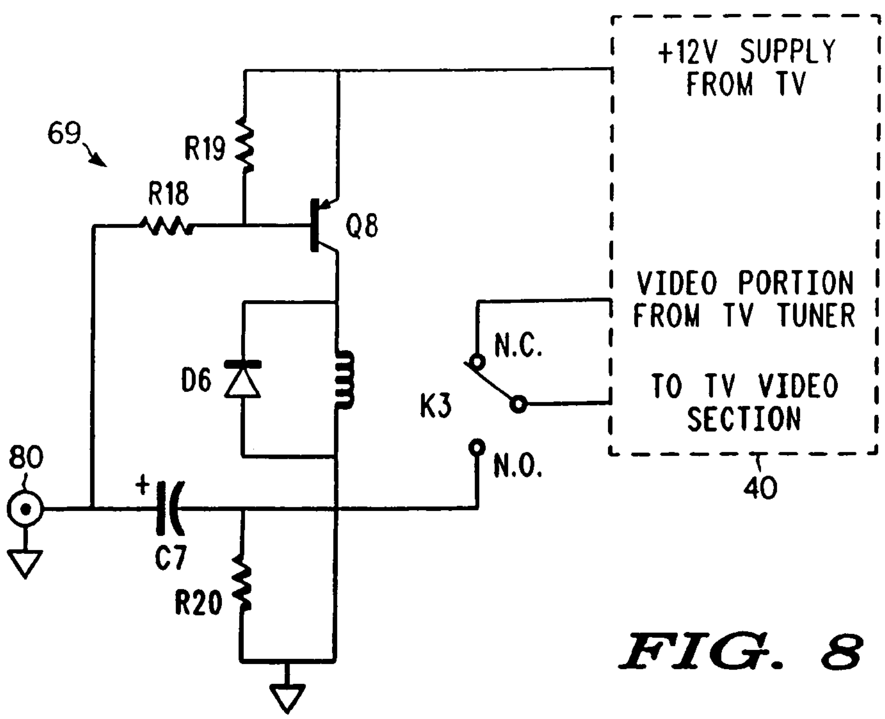
FIG. 8 is a schematic diagram of the video switching module in the receiver of FIG. 3.

Referring to FIG. 8, a video switching module 69 for switching between "normal", or unscrambled video signals, received from the tuner 36 and descrambled video signals from the decoder 18 is shown on FIG. 8. When no signal is present at the input 80 to the module 69, transistor Q8 and relay K3 are turned off, thereby allowing the normal video signal from the tuner 36 to pass through to the signal processing circuitry 40. When a descrambled signal is present at the input 80 to the module 69, the DC component on the signal is blocked by capacitor C7 and is passed to the base of transistor Q8 through current limiting resistor R18. Resistor R19 allows transistor Q8 to turn off when current is no longer applied to the base of Q8. When transistor Q8 is turned on, current flows across the emitter-collector junction of transistor Q8 and energizes relay K3. The associated form C contacts of relay K3 switches the video input to the signal processing circuitry 40 from the tuner 36 to the signal output by the decoder 18. Suppression diode D6 protects transistor Q8 when the descrambled drive pulse terminates which turns-off transistor Q8.

The component values of FIGS. 5–10 are listed below in Table 1.

TABLE 1

| COMPONENT | FIG. NO. | SPECIFICATION |
|---|---|---|
| C1 | 5 | 330 μF |
| C2 | 6 | 330 μF |
| C3 | 9 | 10.0 μF |

TABLE 1-continued

| COMPONENT | FIG. NO. | SPECIFICATION |
|---|---|---|
| C4 | 9 | 330 μF |
| C5 | 9 | 330 μF |
| C6 | 9 | .001, non polarized |
| C7 | 8 | 330 μF |
| C9 | 7 | .001 Mf |
| C11 | 10 | 330 μF |
| D1 | 5 | 1N4148 |
| D2 | 9 | 1N4148 |
| D3 | 9 | 1N4148 |
| D6 | 8 | 1N4148 |
| IC1 | 9 | 741 op amp |
| K1 | 5 | Radio Shack 275-241 |
| K2 | 9 | Radio Shack 275-241 |
| K3 | 8 | Radio Shack 275-241 |
| L1 | 9 | 2.2 μH |
| L2 | 7 | 2.2 μH |
| Q1 | 5 | 2N3906 |
| Q2 | 6 | 2N3906 |
| Q3 | 6 | 2N3904 |
| Q4 | 6 | CD4016 |
| Q5 | 6 | CD4016 |
| Q6 | 9 | 2N3906 |
| Q7 | 9 | 2N3904 |
| Q8 | 8 | 2N3906 |
| Q10 | 10 | 2N3904 |
| R1 | 5 | 1.0 kΩ |
| R2 | 5 | 3.3 kΩ |
| R3 | 6 | 1.0 kΩ |
| R4 | 6 | 3.3 kΩ |
| R5 | 6 | 3.3 kΩ |
| R6 | 6 | 10.0 kΩ |
| R7 | 6 | 3.3 kΩ |
| R8 | 6 | 4.7 kΩ |
| R9 | 9 | 1.0 kΩ |
| R10 | 9 | 3.3 kΩ |
| R11 | 9 | 1.0 kΩ |
| R12 | 9 | 10.0 kΩ |
| R13 | 9 | 1.0 kΩ |
| R14 | 9 | 10.0 kΩ |
| R15 | 9 | 2.0 kΩ |
| R16 | 9 | 2.2 kΩ |
| R17 | 9 | 1.5 kΩ |
| R18 | 8 | 10 kΩ |
| R19 | 8 | 3.3 kΩ |
| R20 | 8 | 75 Ω |
| R23 | 10 | 3.3 kΩ |
| R24 | 10 | 3.3 KΩ |
| R25 | 10 | 1 KΩ |

Since the decoder 18 automatically detects the presence of a scrambled CATV signal and the television 12 automatically detects the presence of a descrambled output signal from the decoder 18, no control messages are exchanged between the television 12 and the decoder 18.

Figure 12:
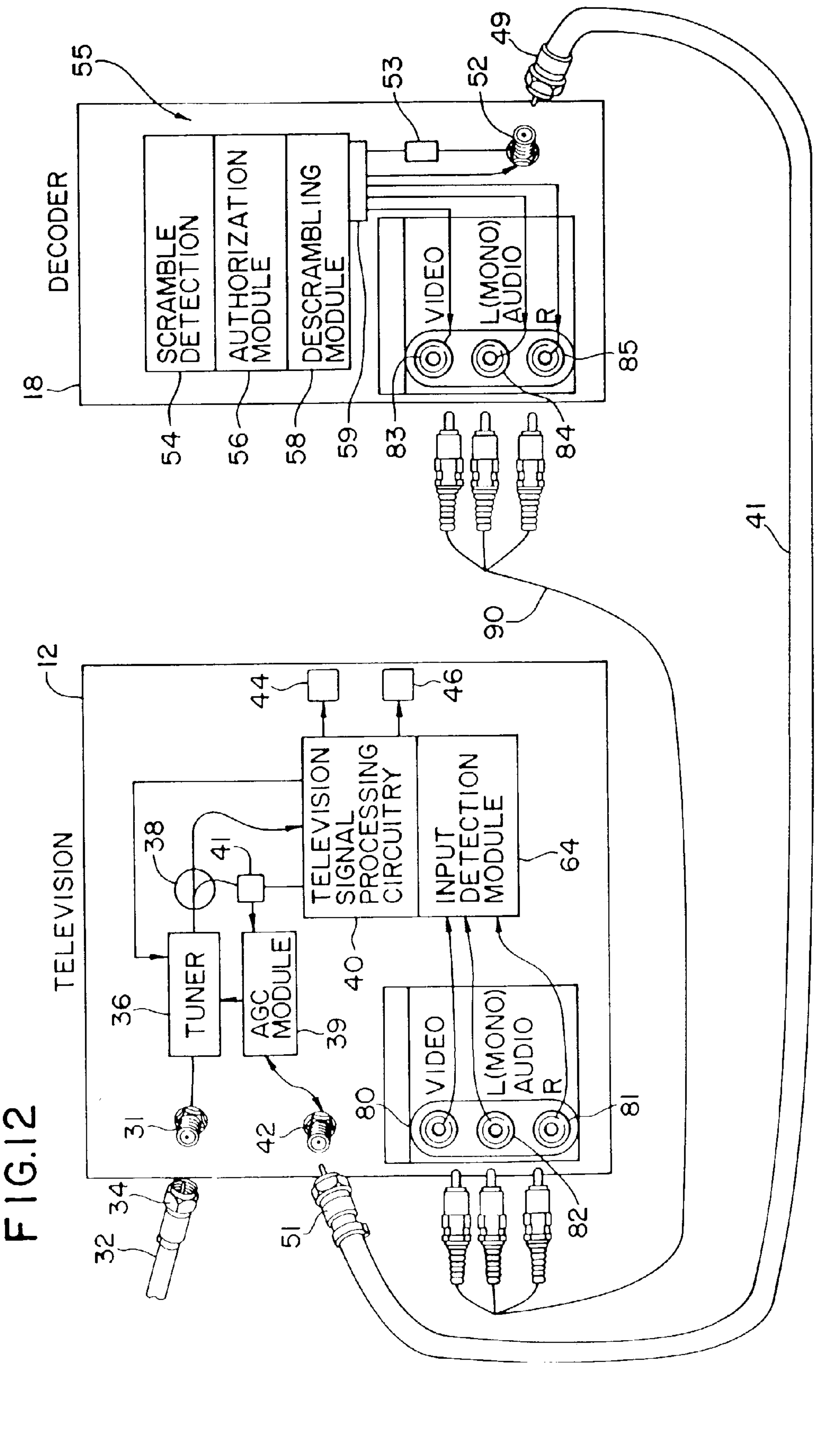
FIG. 12 is a block diagram of a first alternative embodiment of the receiver of FIG. 3.

The preferred embodiment will operate when analog scrambled signals are detected on the 6 MHz CATV channel. However, digital CATV systems multiplex a plurality of video and audio signals onto a single CATV channel. Accordingly, the television 12 must inform the decoder 18 which sub-channel of the digital multiplex to select. As shown in FIG. 12, the television signal processing circuitry 40 outputs a four to twelve bit sub-channel designation, or word, at a frequency above DC and below the IF carrier output to the decoder 18. A four bit word is required for up to 16 sub-carriers, and a twelve bit word is required if a true channel designator is desired. Preferably, the sub-channel number is output from the signal processing circuitry 40 on a 38 KHz carrier to a multiplexer 41. The decoder 18 detects the 38 KHz signal multiplexed with the IF carrier and forwards the sub-channel designation to the descrambling module 58 to descramble the desired sub-channel.

Those skilled in the art would appreciate that multiple decoders 18 may be connected in parallel via the IF/AGC port 42 by using a unity-gain signal splitter with a DC bypass. As described above, only a decoder 18 capable of descrambling the received signal will attempt to do so. The decoder will place a DC signal on the IF/AGC 41 line to control the tuner 36 amplifier gain. Descrambled A/V signals will be output to the appropriate ports 80, 81, 82 for detection by the input detection module 64.

Figure 13:
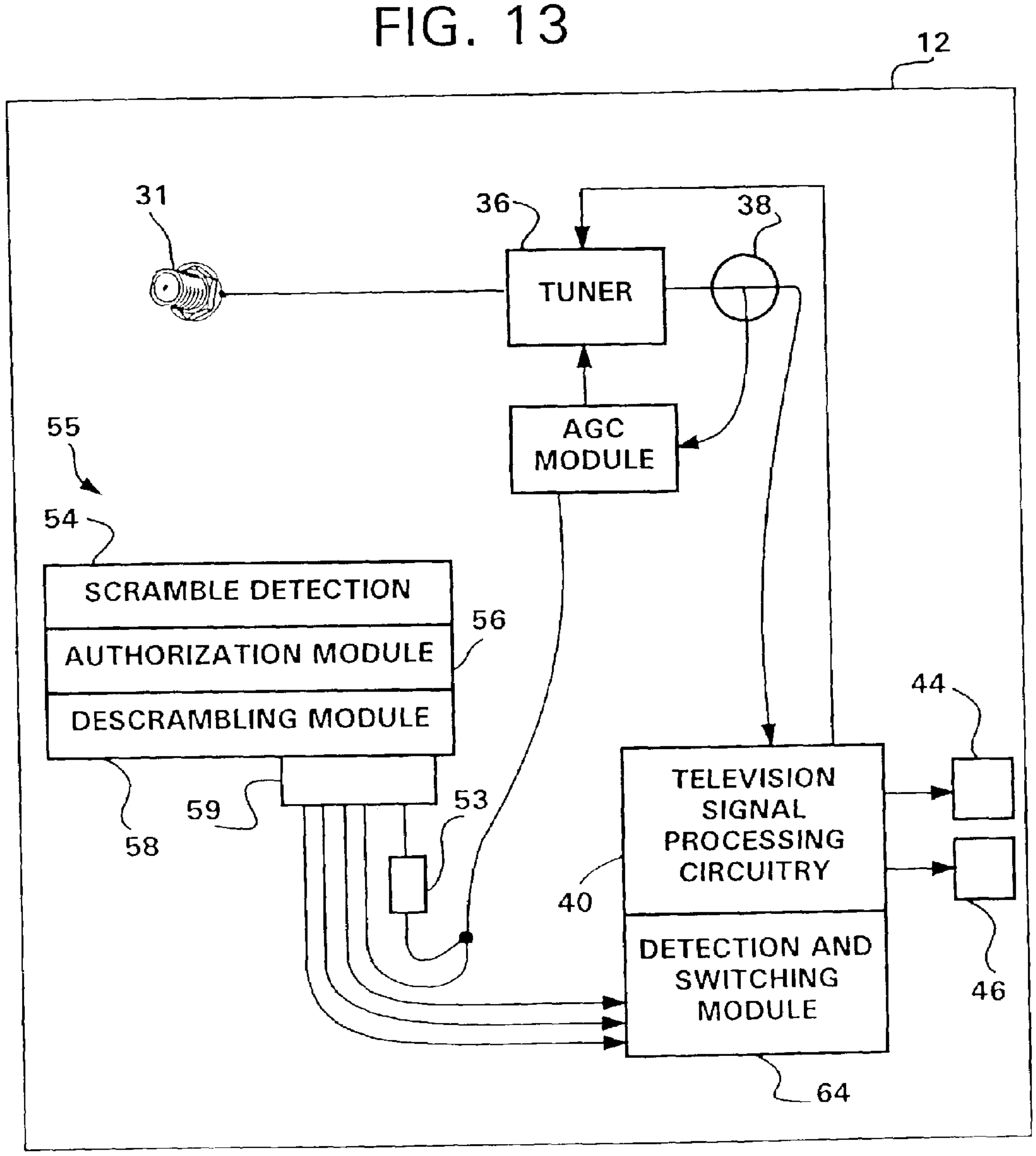
FIG. 13 is a block diagram of an alternative embodiment of the present invention.

Although the invention has been described in part by making detailed reference to the preferred embodiment, such detail is intended to be instructive rather than restrictive. For example, although the preferred embodiment of the decoder 18 is shown as a stand alone module, the decoder 18 may be incorporated as a module within the receiver, as shown in FIG. 13. It will be appreciated by those skilled in the art that many variations may be made in the structure and mode of the operation without departing the spirit and scope of the invention as disclosed in the teachings herein.

What is claimed is:

1. A cable television system comprising:

(a) at least one cable-ready receiver including:

(i) a tuner including an amplifier for outputting an audio and video (A/V) signal via an output of the tuner;

(ii) a two-way signal splitter having an input electrically coupled to the output of the tuner, the splitter being configured to receive the A/V signal directly from the output of the tuner and divide the A/V signal into a first A/V signal which is output from a first output port of the splitter and a second A/V signal which is output from a second output port of the splitter;

(iii) a signal processing circuit electrically coupled to the tuner and the splitter, the signal processing circuit being configured to receive the first A/V signal directly from the first output port of the splitter and process the first A/V signal; and (iv) an automatic gain control (AGC) circuit electrically coupled to the tuner and the splitter, the AGC circuit being configured to receive the second A/V signal directly from the second output port of the splitter and process the second A/V signal; and (b) a decoder electrically coupled to the AGC circuit in the cable-ready receiver, the decoder being configured to determine whether or not the second A/V signal is scrambled.

2. The system of claim 1 wherein the amplifier is controlled by the signaling processing circuit when the decoder determines that the second A/V signal is not scrambled, and the amplifier is controlled by the decoder via the AGC circuit when the decoder determines that the second A/V signal is scrambled.

3. The system of claim 1 wherein the decoder determines whether or not the second A/V signal uses a type of scrambling that can be descrambled by the decoder when the decoder determines that the second A/V signal is scrambled.

4. The system of claim 1 wherein the receiver further comprises:

(v) at least one speaker in communication with the signal processing circuit; and (vi) at least one video monitor in communication with the signal processing circuit, wherein the signal processing circuit separates audio and video information derived from the first A/V signal to provide an audio output to the speaker and a video output to the monitor when the decoder determines that the second A/V signal is not scrambled.

5. The system of claim 1 wherein the receiver further comprises:

(v) at least one speaker in communication with the signal processing circuit; and (vi) at least one video monitor in communication with the signal processing circuit, wherein the decoder separates audio and video information derived from the second A/V signal to provide an audio output to the speaker and a video output to the monitor when the decoder determines that the second A/V signal is scrambled.

6. The system of claim 1 wherein if the decoder determines that the second A/V signal is scrambled using a type of scrambling that cannot be descrambled by the decoder, no further action is taken by the decoder to process the second A/V signal.

7. The system of claim 1 wherein the decoder determines whether or not a subscriber is authorized to receive the second A/V signal.

8. The system of claim 7 wherein the decoder descrambles the second A/V signal only after the decoder determines that the subscriber is authorized to receive the second A/V signal.

9. The system of claim 7 wherein if the decoder determines that the subscriber is not authorized to receive the second A/V signal, the decoder outputs a video signal indicating that the subscriber is not authorized to receive the second A/V signal.

10. The system of claim 1 wherein the cable-ready receiver is a television.

11. The system of claim 1 wherein the cable-ready receiver is a video recorder.

12. A cable-ready receiver comprising:

(a) a tuner including an amplifier for outputting an audio and video (A/V) signal via an output of the tuner;

(b) a two-way signal splitter having an input electrically coupled to the output of the tuner, the splitter being configured to directly receive the A/V signal from the tuner and divide the A/V signal into a first A/V signal which is output from a first output port of the splitter and a second A/V signal which is output from a second output port of the splitter;

(c) a signal processing circuit electrically coupled to the tuner and the splitter, the signal processing circuit being configured to directly receive the first A/V signal from the first output port of the splitter and process the first A/V signal; and (d) an automatic gain control (AGC) circuit electrically coupled to the tuner and the splitter, the AGC circuit being configured to receive the second A/V signal directly from the second output port of the splitter and process the second A/V signal, wherein the amplifier is controlled by the signaling processing circuit when the second A/V signal is not scrambled, and the amplifier is controlled via the AGC circuit when the second A/V signal is scrambled.

13. The receiver of claim 12 further comprising:

(e) at least one speaker in communication with the signal processing circuit; and (f) at least one video monitor in communication with the signal processing circuit, wherein the signal processing circuit separates audio and video information derived from the first A/V signal to provide an audio output to the speaker and a video output to the monitor when the second A/V signal is not scrambled.

14. The system of claim 12 wherein the cable-ready receiver is a television.

15. The system of claim 12 wherein the cable-ready receiver is a video recorder.

16. In a cable television system including at least one cable-ready receiver in communication with a decoder, a method of processing cable television programming signals, wherein the cable-ready receiver includes (i) a tuner including an amplifier for outputting an audio and video (A/V) signal via an output of the tuner, and (ii) a two-way signal splitter having an input electrically coupled to the output of the tuner, the splitter being configured to receive the A/V signal directly from the tuner and divide the A/V signal into a first A/V signal which is output from a first output port of the splitter and a second A/V signal which is output from a second output port of the splitter, the method comprising:

(a) the receiver tuning to a selected one of the programming signals;

(b) the receiver using the amplifier to amplify the selected programming signal;

(c) the receiver processing the selected programming signal to provide the audio and video (A/V) signal;

(d) the decoder determining whether or not the second A/V signal output from the second port of the splitter is scrambled;

(e) using a first control signal provided by the receiver to adjust the gain of the amplifier when the second A/V signal output from the second port of the splitter is determined by the decoder not to be scrambled;

(f) using a second control signal provided by the decoder to adjust the gain of the amplifier when the second A/V signal output from the second port of the splitter is determined by the decoder to be scrambled; and (g) when the decoder determines that the second A/V signal is not scrambled, separating audio information and video information derived from the first A/V signal output from the first port of the splitter.

17. The method of claim 16 further comprising:

(h) the decoder determining whether or not the second A/V signal uses a type of scrambling that can be descrambled by the decoder when the decoder determines that the second A/V signal is scrambled.

18. The method of claim 16 wherein the cable-ready receiver further comprises at least one speaker and at least one video monitor, the method further comprising:

(h) using the audio information to drive the at least one speaker: and (i) using the video information to drive the video monitor.

19. The method of claim 16 further comprising:

(h) the decoder separating audio and video information derived from the second A/V signal to provide audio and video output signals when the decoder determines that the second A/V signal is scrambled.

20. The method of claim 16 further comprising:

(h) the decoder determining whether or not a subscriber is authorized to receive the second A/V signal.

21. The method of claim 20 further comprising:

(i) the decoder descrambling the second A/V signal only after the decoder determines that the subscriber is authorized to receive the second A/V signal.

22. The method of claim 20 further comprising:

(i) if the decoder determines that the subscriber is not authorized to receive the second A/V signal, the decoder outputting a video signal indicating that the subscriber is not authorized to receive the second A/V signal.

23. The method of claim 16 wherein the cable-ready receiver is a television.

24. The method of claim 16 wherein the cable-ready receiver is a video recorder.

25. A cable-ready receiver comprising:

(a) a tuner including an amplifier for outputting an audio and video (A/V) signal via an output of the tuner; and (b) a two-way signal splitter having an input electrically coupled to the output of the tuner, the splitter being configured to receive the A/V signal directly from the tuner and divide the A/V signal into a first A/V signal which is output from a first output port of the splitter and a second A/V signal which is output from a second output port of the splitter, wherein the amplifier is controlled by a first control signal received by the tuner via a first path when the second A/V signal is not scrambled, and the amplifier is controlled by a second control signal received by the tuner via a second path that is independent of the first path when the second A/V signal is scrambled.

26. The receiver of claim 25 wherein the cable-ready receiver is a television.

27. The receiver of claim 25 wherein the cable-ready receiver is a video recorder.

28. In a cable television system including at least one cable-ready receiver in communication with a decoder, a method of processing cable television programming signals, wherein the cable-ready receiver includes (i) a tuner including an amplifier for outputting an audio and video (A/V) signal via an output of the tuner, and (ii) a two-way signal splitter having an input electrically coupled to the output of the tuner, the splitter being configured to receive the A/V signal directly from the tuner and divide the A/V signal into a first A/V signal which is output from a first output port of the splitter and a second A/V signal which is output from a second output port of the splitter, the method comprising:

(a) the receiver tuning to a selected one of the programming signals;

(b) the receiver using the amplifier to amplify the selected programming signal;

(c) the receiver processing the selected programming signal to provide the audio and video (A/V) signal;

(d) the decoder determining whether or not the second A/V signal output from the second port of the splitter is scrambled;

(e) routing a first control signal to the tuner via a first path to adjust the gain of the amplifier when the second A/V signal output from the second port of the splitter is determined by the decoder not to be scrambled; and (f) routing a second control signal to the tuner via a second path that is independent of the first path to adjust the gain of the amplifier when the second A/V signal output from the second port of the splitter is determined by the decoder to be scrambled.

29. The receiver of claim 28 wherein the cable-ready receiver is a television.

30. The receiver of claim 28 wherein the cable-ready receiver is a video recorder.

* * * * *